Sept. 7, 1937.     R. P. BREESE     2,092,243
COUPLING
Filed May 22, 1935
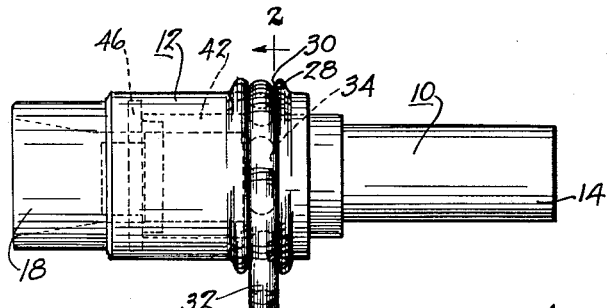
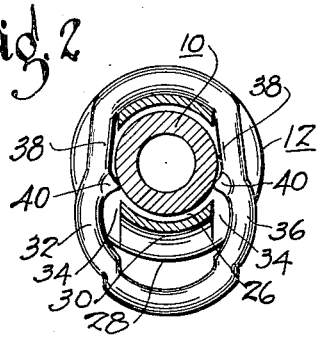
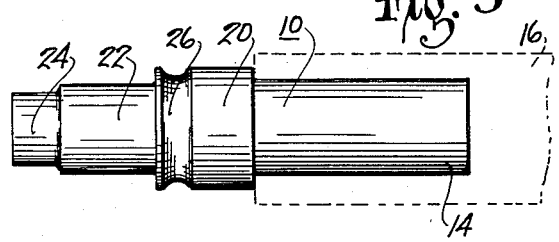
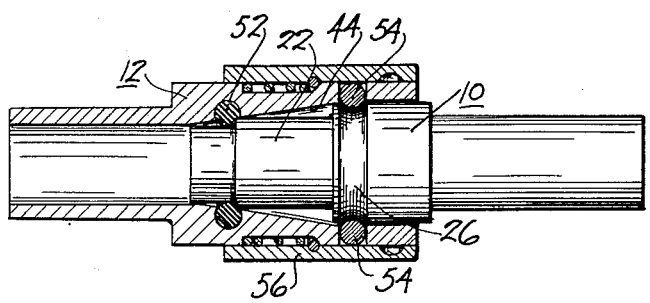
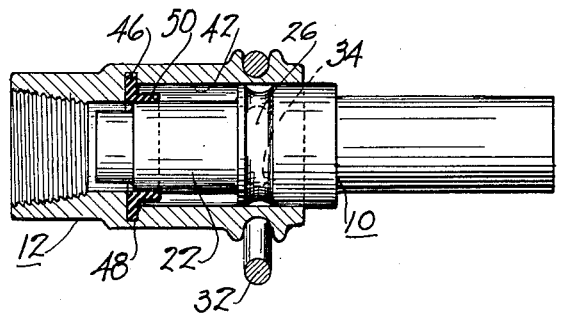
INVENTOR.
ROBERT P. BREESE
BY G. E. Wilson
ATTORNEY Patented Sept. 7, 1937

2,092,243

UNITED STATES PATENT OFFICE 2,092,243

COUPLING

Robert P. Breese, South Bend, Ind., assignor to Bendix Products Corporation, South Bend, Ind., a corporation of Indiana Application May 22, 1935, Serial No. 22,761

1 Claim. (Cl. 285—161)

This invention relates to couplings and more particularly to a coupling member adapted to be quickly and easily manipulated.

In one desirable embodiment of the invention a coupling, designed particularly for interconnecting the fluid control lines between tractor and trailer vehicles, is designed to provide a coupling wherein fluid losses are minimized, and wherein the coupling may be manipulated with the greatest ease.

An object of this invention is therefore to provide a coupling wherein simple means are employed to couple and uncouple the connection.

A further object of the invention is to provide a coupling wherein a possibility of injuring the various parts of the coupling upon manipulation thereof is minimized.

A still further object is to provide a coupling seal wherein a resilient member is drawn into sealing engagement between the members when subatmospheric pressures are transmitted through the coupling, and wherein the sealing member is urged into contact with another member when the coupling is employed to transmit superatmospheric pressure.

A still further object of the invention is to provide a coupling member in which the various members may be employed with corresponding members of other connectors now in use.

A further object of this invention is to provide a male coupling member having straight side walls, which may be employed with female coupling members having either straight side walls or tapered side walls.

A still further object of the invention is to provide a male member having stepped surfaces wherein it is impossible for the locking devices to engage the side walls of the member to score or injure the member upon manipulation of the coupling.

Yet another object of the invention is to provide a coupling member of simplified design which may be manufactured more economically than similar devices of the prior art.

Other objects and advantages of this invention will be apparent from the following detailed description, together with the accompanying drawing submitted for purposes of illustration only, and not intended to define the scope of the invention, reference being had for that purpose to the subjoined claim.

In the drawing, wherein similar reference characters refer to similar parts throughout the several views:

Figure 1 is a view of an assembled coupling embodying the present invention;

Figure 2 is a view taken on the line 2—2 of Figure 1;

Figure 3 is a view in elevation of the male member of the coupling;

Figure 4 is a view showing the improved male member cooperating with an old type female member; and Figure 5 is a view showing the new type male and female members.

Referring to the embodiment shown in Figure 1, there is shown a coupling having a male member 10 and a female member 12 adapted to coact to form a fluid-tight seal to connect fluid lines adapted to transmit either subatmospheric or superatmospheric pressure. The member 10 is provided with an extension 14, adapted to receive a fluid hose 16. The member 12 is provided with a threaded portion 18 adapted to clamp the member 12 to a connection.

The member 10 is provided with stepped surfaces 20, 22 and 24. The surface 20 is provided with a concentric groove 26. The member 12 is provided with a section of increased outer diameter 28 having a groove 30 adapted to receive a locking link 32 movable transversely across the axis of the member 12, through milled slots 34. The locking link 32 is designed with a section of increased internal diameter 36 of suitable size to receive the stepped surface 20 of the member 10. The locking link 32 is also provided with a section having straight side walls 38 slidable in the milled slots 34. The distance between the straight side walls 38 of the locking link 32 is less than the diameter of the stepped surface 20 of the member 10, and is such as to cause the side members 38 to engage the slot 26 of the member 10 to securely clamp the members 10 and 12 together. The locking link 32 is provided with a pair of locking flanges 40 intermediate the straight side walls 38 of the section of increased internal diameter 36.

The member 12 may be either a structure wherein a section of constant internal diameter 42 is employed, as shown in Figures 1 and 5, or it may be of a structure wherein a tapered section 44 is employed as shown in Figure 4.

A packing ring 46, engaged in an annular slot 48 of the member 12, may be employed. In this embodiment of the invention the packing ring 46 is provided with an annular section 50 designed to be engaged by the stepped surface 22 of the member 10, when the two members are moved into locking relation. This type of packing is especially desirable where subatmospheric pressure is transmitted in the hose, because the subatmospheric pressure will draw the annular section 50, carried by the member 12, into engagement with the stepped surface 22 of the member 10 to effect a very close seal between the members 10 and 12. It is believed to be obvious, of course, that where the joint is employed to transmit superatmospheric pressure the annular section 50 should be reversed so that the pressure exerted within the coupling will urge the annular section 50 into engagement with the side walls 42 of the member 12.

In the embodiment shown in Figure 4, a packing material 52, formed of an annular ring of rubber or other suitable material, is carried by the member 12. This packing material 52 is engaged by the end portion of the stepped surface 22 of the member 10 upon interconnection of the two members 10 and 12.

The male member 10 is, of course, designed to coact with other types of female members and locking devices such as that disclosed in Figure 4, wherein ball members 54, carried by the member 12, are designed to engage the concentric groove 26 upon movement of a locking sleeve 56 carried by the member 12.

In the operation of this device, to lock the coupling the member 10 is inserted into the member 12, and the locking link 32 is moved transversely across the axis of the member 12 to move the side walls 38 into engagement with the groove 26 to securely lock the member 10 within the member 12. The locking flanges 40 engage the periphery of the groove 26 to prevent the locking link 32 from moving to a position to unlock the coupling inadvertently. The stepped surface 22 engages the annular section 50 of packing ring 46 to securely seal the coupling and prevent the escape of fluid therefrom whether subatmospheric or superatmospheric pressure is transmitted through the coupling.

The male member 10, thus provided, is designed to coact with female members having tapered or straight side walls, and is so designed by having a stepped surface 22 of a diameter less than the internal diameter of the groove 26 that injury to the surface 22, by contact with the locking flanges 40 of Figure 2, or the balls 54 of Figure 4, is avoided upon actuation of the coupling member.

While the invention has been described with reference to certain preferred embodiments, it is not intended to limit the scope of the invention to the features discussed, nor otherwise, than by the terms of the following claim.

I claim:

A male element of a pipe joint adapted to be used with a female element having either a conical seat or a cylindrical seat, said seat terminating in a gasket receiving shoulder, said male element comprising a first cylindrical section and a second cylindrical section of greater diameter providing a shoulder at the junction of the two cylindrical sections, said second shoulder adapted to abut the gasket of the female member having the conical seat and the enlarged section adapted to sealingly engage the gasket seated on the shoulder of the female member with the cylindrical seat.

ROBERT P. BREESE.